United States Patent Office 3,487,115
Patented Dec. 30, 1969

3,487,115
POLYOXYALKYLENE GLYCOLS PREPARED
FROM TETRAHYDROFURAN
John A. Lovell, Cuyahoga Falls, Ohio, assignor to The
Goodyear Tire & Rubber Company, Akron, Ohio, a
corporation of Ohio
No Drawing. Continuation of application Ser. No. 30,741,
May 23, 1960. This application Dec. 8, 1966, Ser. No.
600,264
Int. Cl. C07c 41/02, 43/02
U.S. Cl. 260—615                                    1 Claim

ABSTRACT OF THE DISCLOSURE

This invention relates to an improved process for producing an adjusted hydrophilic-hydrophobic modified polytetramethylene ether glycol of about 700 to 12,000 molecular weight and to the product of said process. More particularly, this invention relates to those adjusted hydrophilic-hydrophobic modified polytetramethylene ether glycols, which may be converted to their bis chloroformates and to said bis chloroformates which may be extended by the aqueous diamine method to produce polyurethane elastomers having excellent physical properties.

---

This application is a continuation of application Ser. No. 30,741 filed May 23, 1960, and now abandoned.

It is known to produce polyurethanes by extending hydroxyl-terminated tetrahydrofuran polymers with polyisocyanates. These polyurethanes are satisfactory for use in foamed and cast articles; however, since these rubbers are not produced in the latex form per se, the polyurethane latices are not used extensively, if at all, to produce shaped articles. A further disadvantage of these polymers is that they cannot be used to produce polyurethane elastomers which have urethane nitrogens free of hydrogen bonding; and these elastomers which have nitrogens free of hydrogen bonding have been reported to have the unique property of exhibiting good humidity stability and resistance to high temperature degradation. A still further disadvantage of the polyurethane rubbers produced from the prior art tetrahydrofuran polymers relates to the fact that relatively high priced polyisocyanate is required for their production and to the need for special manufacturing equipment—useful only for preparing polyurethane rubbers by the diisocyanate method. On the other hand, the emulsion equipment useful for making conventional butadiene/styrene rubber may be used in the bis chloroformate aqueous diamine method to produce polyurethane elastomers.

Since conversion of tetrahydrofuran polyether glycols to their bis chloroformates and the extension of said bis chloroformates by the aqueous diamine method eliminates some of the above disadvantages, many attempts have been made to use this method to produce suitable polyurethane rubbers from the tetrahydrofuran polymers. However, the rubbers that were obtained exhibited physical properties in many respects inferior to those of the polyisocyanate produced elastomers. For example, the straight tetrahydrofuran and the modified tetrahydrofuran derived polyether glycols, when extended by the bis chloroformate aqueous diamine method, gave elastomers having low dilute solution viscosities, and poor milling and banding characteristics; while the identical materials, when extended by the diisocyanate method gave elastomers free of the aforesaid disadvantages.

Thus, a principal object of this invention is to produce an adjusted hydrophilic-hydrophobic modified polytetramethylene ether glycol of about 700 to 12,000 molecular weight which is responsive to extension via the bis chloroformate-aqueous diamine method (sometimes designated herein as the diamine method) to produce a polyurethane elastomer as a water dispersion (frequently referred to herein as latex) with said elastomer being characterized by a relatively high dilute solution viscosity, and good milling and banding properties, and the further advantage of having excellent resistance to high temperatuure degradation, good stability under high humidity conditions and a high melting point, when the diamine used for its extension is a disecondary diamine. A further object of this invention is to provide a modified polytetramethylene ether glycol which is essentially as receptive to extension to a polyurethane elastomer by the diamine method as by the diisocyanate method. A further object of this invention is to provide a mixed modified polytetramethylene ether glycol which may be extended to form a latex of a polyurethane elastomer having superior low temperature properties and containing sufficient unsaturation to be sulfur curable when this is so desired. Another object of this invention is to provide a method for producing the above novel polyether glycols. A still further object of this invention is to provide a method for producing mixed modified polytetramethylene ether glycols which have lower melting points, i.e. below 10° C., and which may contain unsaturation.

These objects can be obtained under certain specific critical polymerization conditions by polymerizing tetrahydrofuran at a temperature below about 10° C. in the presence of a catalyst and of a hydrophilic initiator of the type hereinafter explained. One of these conditions is that the catalyst be added to the tetrahydrofuran prior to the time the hydrophilic initiator is added; otherwise, the tetrahydrofuran polymer will not have the above indicated advantages. Further necessary conditions are that the catalyst be present in a greater concentration than the hydrophilic initiator and that the hydrophilic initiator have a concentration of at least 1 mol and no more than 5.5 mols per mol of glycol produced. In the event these critical limits are not maintained the polyether glycol obtained does not have the desired adjusted hydrophilic-hydrophobic properties which permit the polyether glycol to be extended substantially as readily by the diamine method as by the diisocyanate one.

Briefly, the objects of this invention are accomplished by polymerizing tetrahydrofuran at a temperature below about 10° C. in the presence of a Lewis acid type catalyst and a hydrophilic initiator capable of yielding the —O—(CH$_2$)$_y$— group, where $y$ is an integer between 1 and 3, inclusive, with said catalyst being added prior to the hydrophilic initiator and in quantities sufficient to give an excess of catalyst over said initiator, said initiator then being added in sufficient quantities to give at least one mol and no more than 5.5 mols per mol of polymer produced; and then hydrolyzing the catalyst polymer complex to hydroxyl terminate the polymer.

To be specific, if the tetrahydrofuran and hydrophilic initiator are placed in the reactor before the catalyst, the resulting polymethylene ether glycol will not be extendable by the bis chloroformate aqueous diamine method to give a millable and bandable rubber. This is true even though the same product when extended by the diisocyanate method gives a readily millable and bandable elastomer. Thus, it is indeed unexpected and amazing to discover this difference in the behavior of these polymethylene ether glycols when extended by the above two methods.

On the other hand, applicant has discovered that reversal of the order of addition of hydrophilic initiator and catalyst while maintaining these critical limitations produces a polyether glycol which does not exhibit this difference in response to extension by the diisocyanate and the diamine method. By practicing the conditions of this invention, i.e., adding the catalyst prior to the addition of the hydrophilic initiator and maintaining the aforesaid critical relationships between the catalyst and hydrophilic initiator, the resulting polymeric glycol extends to give substantially the same elastomer by either method. Since these critical conditions of polymerization give products which do not have the disadvantages associated with the prior art tetrahydrofuran derived polyether glycols, it should be obvious applicant's process produces a polyether glycol different from those of the prior art.

This difference between applicant's modified polyether glycols and the products of the prior art may result from the fact that applicant's process produces a glycol which has an adjusted hydrophilic-hydrophobic area in the vicinity of and connected to at least one of the hydroxyls of said glycol. For example, it is thought that this adjusted hydrophilic-hydrophobic property is introduced into the glycol by the hydrophilic initiator. This belief is supported by my experimental data as those initiators which yield the hydrophilic group, —O—$(CH_2)_y$—, are able to produce polyether glycols having the property designated herein as adjusted hydrophilic-hydrophobic properties in the area adjacent and connected to at least one of the hydroxyls of said glycol.

The hydrophilic initiators of this invention which yield only the hydrophilic group —O—$(CH_2)_y$— group, where $y$ is an integer having the values of 1, 2, and 3, inclusive, are ethylene oxide, trimethylene oxide and dioxolane. The use of hydrophobic initiators which do not yield this hydrophilic group, but instead yield ether groups that act to hinder the hydroxyl of the glycol, i.e. no primary hydroxyls, gives a polyether glycol which exhibits different results upon extension by the diisocyanate and the diamine methods. For example, propylene oxide-1,2 not only yields the hydrophilic group, —O—$(CH_2)_y$—, but also yields the hydrophobic group

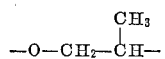

Hence, use of propylene oxide-1,2 as an initiator results in at least some of the hydroxyls of the resulting polymeric glycol being attached to a secondary carbon atom; this attachment to the secondary carbon atom is thought to be one explanation for this difference in extension behavior of the propylene oxide initiated polytetramethylene ether glycols.

It should be appreciated that homopolymerization of tetrahydrofuran, for instance, results in the creation of a number of repeating oxytetramethylene groups. If tetrahydrofuran is copolymerized with other monomers, the repeating oxytetramethylene groups or the polytetramethylene ether groups may be interspersed with other monomer groups to give a polymer of the alternate, block or random type depending on the experimental conditions. In this specification and claims, the oxytetramethylene group is spoken of as repeating, although it is realized that the oxytetramethylene group may be separated by other monomer linkages to give a polymer of the alternate, block or random type.

A preferred embodiment of this invention relates to the polymerization of other monomers with tetrahydrofuran to yield co- or higher polymers having improved low temperature properties as well as that of its rubber derivatives. If the other monomer copolymerized with tetrahydrofuran contains unsaturation, the rubbers produced from these co- or ter- polymers will be sulfur curable. Even though the prior art methods of producing the co-, ter- and higher polymers of tetrahydrofuran give polymeric ether glycols which yield sulfur curable rubbers, unfortunately, they could not be extended by the bischloroformate aqueous diamine method to give elastomers having properties similar to the elastomers formed by diisocyanate extension. Hence, the practical use of these co-, ter- and higher ether glycol polymers of tetrahydrofuran have been limited to the preparation of rubbers by the diisocyanate method. However, by applicant's preferred embodiment, the resulting co-, ter- and higher polymeric ether glycols are obtained with the aforesaid adjusted hydrophilic-hydrophobic properties in the vicinity of one the glycol hydroxyls and are as responsive to extension by the bis chloroformate aqueous diamine method as by the diisocyanate method. Hence, this embodiment of applicant's invention permits both low temperature and unsaturated polyurethane elastomers to be made in latex form. Also, this embodiment affords a means for producing these polymeric glycols useful for producing commercially acceptable, sulfur curable polyurethane elastomers which contain no free hydrogens on the urethane nitrogen when the diamine used for the extension is a disecondary diamine.

Normally those monomers used to produce the co-, ter- and higher polymeric glycols of tetrahydrofuran are used in a minor amount, i.e. about 1 to 30% by weight, and preferably 5 to 25%. As indicated above, the primary reason for preparing the ter- and higher polymers of the polytetramethylene ether glycols is to change and enhance the properties of the straight tetrahydrofuran polymers to thereby obtain rubbers having better low temperature properties and the ability to be sulfur cured. Hence in this description the term "straight tetrahydrofuran polymers" is used to mean a hydroxyl-terminated tetrahydrofuran polymer produced in the absence of an initiator or other monomer and having essentially hydrophobic properties in the vicinity of its hydroxyls, and it should be distinguished from the modified polymeric glycols of this invention which comprises at least a major portion of tetrahydrofuran and at least 1 mol and no more than 5.5 mols of a hydrophilic initiator per mol of glycol.

Generally, the mixed polymeric glycols of this invention are made with two purposes in mind: to introduce unsaturation and to obtain better low temperature properties in the glycol derived rubbers. When the object is to introduce unsaturation, those epoxy aliphatic monomers containing unsaturation and from 4 to 10 carbon atoms are used. Examples of these useful monomers are: the alkadiene monoxides, preferably of 4 to 6 carbons, such as butadiene monoxide and isoprene monoxide, and the epoxy alkyl alkylene ethers such as epoxy octyl octylene ether, allyl glycidyl ether and glycidyl vinyl ether. These monomers give mixed modified polymethylene ether glycols that are unsaturated and which also contain a majority of repeating tetramethyleneoxy groups, a minor number of repeating epoxy aliphatic monomer derived groups and at least 1 mol and no more than 5.5 mols of hydrophilic initiator monomer for each mol of polymeric glycol.

The presence of more than about 30% of unsaturated epoxy aliphatic monomer in the polymeric ether glycol results in the polyurethane rubber having a very high degree of unsaturation. Very high unsaturation in rubbers is not desirable, since it reduces oxidation stability of the rubber. Therefore, it is frequently found desirable to limit the degree of unsaturation to no more than about 1 double bond for each 500 to 5000 units of molecular weight, although some compounders maintain that at least 1 double bond per 8000 units of molecular weight is required to obtain some sulfur curing effects.

To avoid the undesirable effects of very high unsaturation and still obtain the desired low temperature properties in the finished rubber, it is desirable to use a saturated epoxy aliphatic monomer for example: propylene oxide-1,2; styrene oxide; butylene oxide-1,2; butylene oxide-2,3 and amylene oxide, in conjunction with the unsaturated epoxy aliphatic monomer to give a polymer which may be converted to a polyurethane elastomer containing both superior low temperature and sulfur curing properties. Also, this introduces into the tetramethyleneoxy backbone of the polyether glycol other polymethyleneoxy groups where the number of methylenes per polymethyleneoxy group may be some number such as 3 or 8 instead of four.

It is a preferred embodiment of this invention to polymerize at least four monomers, i.e. tetrahydrofuran, a hydrophilic initiator, an unsaturated epoxy aliphatic monomer and a saturated epoxy aliphatic monomer, to obtain adjusted hydrophilic-hydrophobic mixed modified polytetramethylene ether glycols which yield sulfur curable polyurethane elastomers having low temperature properties far superior to the polyurethane elastomers derived from the straight tetrahydrofuran polyether glycols. Normally, these preferred mixed modified glycols will contain on a weight basis in excess of 50% of tetrahydrofuran, 1 to less than about 20% of an unsaturated epoxy aliphatic monomer, about 3 to 30% of a saturated epoxy aliphatic monomer and at least 1 mol and no more than 5.5 mols of the initiator per mol of polymeric glycol.

The catalysts useful for the preparation of the adjusted hydrophilic-hydrophobic modified polytetramethylene polyether glycols are the well known Lewis acid type materials which are capable of breaking the oxygen carbon bond of tetrahydrofuran and thereby effecting the polymerization of tetrahydrofuran. The catalysts of this nature are well known and are described in the prior art.

Specific examples of some of these materials are antimony pentachloride, a mixture of 1 part of ferric chloride to 1 part of thionyl chloride, fluorosulfonic acid, etc. The preferred catalysts are boron trifluoride and boron trifluoride etherate, since these materials give polytetramethylene ether glycols which extend by the aqueous diamine method to give polyurethane elastomers having relatively higher dilute solution viscosities than those produced by the other Lewis acid type catalysts.

It has been found that as long as the catalyst concentration is in excess of 1 mol and no greater than 4 mols for each mol of initiator used, the rate of reaction is not appreciably affected; but the molecular weight of the polymer may be controlled by adjusting the ratio of the concentration of initiator to monomer within the range of 1 to 4 mols of monomer per mol of initiator. In general, high initiator to tetrahydrofuran ratios tend to produce lower molecular weight polymers while relatively low initiator to tetrahydrofuran ratios tend to give high molecular weight polymers. For example, adjustment of the initiator to monomer ratio may be used to produce polytetrahydrofuran ether glycols of either the modified or mixed modified type having a molecular weight from about 700 to 12,000 with the preferred range being from about 1500 to about 3500.

It is thought that the initiator and catalyst first form a complex which serves as a nucleus for the polymerization of tetrahydrofuran and/or the other monomers. Therefore, it is necessary to treat the final polymerization product with sufficient water to decompose or hydrolyze this catalyst complex and thereby hydroxyl terminate said polymer to thereby produce the polymeric glycol. Frequently, it is advantageous to warm the polymerization product during the water treatment to facilitate the hydrolysis, breaking of any emulsions formed and washing to remove the catalyst. The washed product may be treated to remove the unreacted monomer, water, etc. Vacuum distillation is an excellent way to accomplish this and thereby obtain the desired adjusted hydrophilic-hydrophobic modified polytetramethylene ether glycol relatively free of most impurities.

In this specification the terms "millable" and "bandable" rubbers have been used to designate one of the physical property differences exhibited during milling and banding when certain polyether glycols were extended by the diisocyanate and the diamine methods. Our experience indicates that polyurethane elastomers containing only initiator and tetrahydrofuran monomers are millable and bandable when the dilute solution viscosity of said elastomer is in excess of about 1.5. In the case where the polyurethane elastomer is derived from those polyether glycols containing tetrahydrofuran, epoxy aliphatic monomer and initiator, the dilute solution viscosity of the elastomer should be in excess of about 1.3 before good milling and banding characteristics are obtained. With a dilute solution viscosity less than these values, the elastomers tend to stick to the mill and have to be scraped off with a knife. It has been noted also that polyurethane elastomers produced from polyether glycols prepared from only two monomers must have a relatively higher dilute solution viscosities before good milling characteristics are obtained. Therefore, the dilute solution viscosity of the polyurethane elastomers derived from the copolymers of tetrahydrofuran should have a dilute solution viscosity of at least about 1.8 and preferably 2 to about 3 to obtain the superior properties of this invention. On the other hand, the polyurethane elastomers derived from the ter- and higher polymers of tetrahydrofuran may have a dilute solution viscosity as low as 1.3 and still have fair milling and banding characteristics, but the preferred dilute solution viscosity for these elastomers is at least about 1.5 to about 3.

This invention is further exemplified in the following examples wherein all parts are by weight unless otherwise indicated. Dilute solution viscosities were determined at 30° C. on 0.3 gram of elastomer dissolved in 100 milliliters of chloroform and expressed as the natural log of the ratio of the viscosity of the solution to the solvent divided by the solute concentration.

EXAMPLE 1

(A) Preparation of the polyether glycol

Tetrahydrofuran was charged into a clean, dry, 2-liter resin pot equipped with a stirring assembly, a dry nitrogen inlet tub and a water condenser. The tetrahydrofuran (500 parts) was cooled in the pot to below $-15°$ C. and a blanket of nitrogen maintained. A catalyst solution consisting of boron trifluoride (19.4 parts) and 200 parts of tetrahydrofuran was added to the resin pot. Then the initiator solution consisting of ethylene oxide (9.75 parts) and 300 parts of tetrahydrofuran was added slowly to the stirring mixture. After about 45 minutes the reaction mixture had warmed to 4° C.; then 600 parts of water was added. The mixture was warmed to hydrolyze the catalyst-initiator complex. It was washed to remove the last traces of acid, and the water and unreacted monomer were removed by vacuum distillation. The cooled product was stored in an airtight metal container. This product had a molecular weight of 5430 and no unsaturation.

(B) Extension of the polyether glycol by the aqueous bis chloroformate diamine method One mol of the polyether glycol of A above was dissolved in 1 mol of toluene and saturated with phosgene at 0° C. After several hours, the phosgene was removed by gassing with nitrogen to give a toluene solution of the bis chloroformate of said glycol. Then two mols of piperazine were dissolved in 500 ml. of water and this mixture was mixed with 500 ml. of a water solution comprising 4 parts of sodium hydroxide and 2 parts of sodium lauryl sulfonate. This aqueous piperazine solution was cooled to $-5°$ C. and then the bis chloroformate in toluene solution was added slowly to the cooled piperazine solution and allowed to react to obtain a rubbery latex. This latex was coagulated by boiling with additional amounts of water. The coagulate was washed and dried to give a finished elastomer which had good rubbery properties and a dilute solution viscosity of 2.6.

EXAMPLE 2

Preparation of the terpolymer of the mixed modified tetramethylene ether glycol

The procedure of Example 1 was repeated using 900 parts of tetrahydrofuran, 20 parts of boron trifluoride, 9 parts of ethylene oxide and 50 parts of allyl glycidyl ether. Prior to the water hydrolysis step, the allyl glycidyl ether, dissolved in 15 parts of hexane, was stirred slowly into the mixture over a period of about 2 hours and allowed to react. Then 600 parts of water was added to the resulting mixture to decompose the initiator-catalyst complex. This terpolymer had a slightly yellow color, a molecular weight of 3,280 with 1 double bond for each 2060 units of molecular weight and a hydroxyl number of 39.2.

This terpolymer was converted to the bis chloroformate and extended with piperazine in accordance with the procedure of Example 1(B). The resulting polyurethane elastomer exhibited a slight tendency to gel. In fact the percent gel in chloroform was about 2% by weight. This elastomer had an iodine number of 12 and a dilute solution viscosity of 1.78, said dilute solution viscosity being determined at 30° C. using 0.3 gram of elastomer dissolved in 100 milliliters of chloroform.

If quinone or other suitable antioxidant was present during the polymerization, these polyurethane elastomers were obtained essentially free of gel, since the antioxidant inhibited gel formation or crosslinking.

EXAMPLE 3

The experiment of Example 2 was repeated except that the allyl glycidyl ether was added to the tetrahydrofuran prior to the addition of the boron trifluoride and ethylene oxide. The polyethylene glycol of this experiment had a molecular weight of 2530. When it was phosgenated and extended in accordance with the teachings of Example 1(B), the resulting elastomer had a dilute solution viscosity of less than 1 and exhibited poor milling and banding characteristics. This experiment is excellent confirmation of the criticalness of the order of addition of the initiator in this invention.

EXAMPLE 4

The polymerization of Example 1 was repeated, except 0.8% by weight of trimethylene oxide was used as the initiator instead of ethylene oxide. The molar ratio of trimethylene oxide to boron trifluoride was 0.05:1 while the molar ratio of the trimethylene oxide to tetrahydrofuran was 0.016:1. The polyether glycol derived from this experiment had a clear, light color and a hydroxyl number of 9.9 and a molecular weight of 11,400. One mol of this copolymer of trimethylene oxide and tetrahydrofuran was converted to the bis chloroformate and extended with piperazine in accordance with the procedure of Example 1(B). The resulting elastomer exhibited excellent physical properties and had a dilute solution viscosity of 1.96.

EXAMPLE 5

Preparation of a tetrapolymer

The procedure used in Example 2 for preparing the terpolymer was repeated except 750 parts of tetrahydrofuran, 18.8 parts of boron trifluoride, 9.75 parts of ethylene oxide and 100 parts of allyl glycidyl ether were used. Prior to the addition of the water to hydrolyze the initiator catalyst complex, 150 parts of propylene oxide was stirred slowly into the terpolymer catalyst complex and associated ingredients. Then it was allowed to react before it was hydrolyzed with 600 parts of boiling water. The polymer obtained from this experiment was characterized as follows: molecular weight 4675; hydroxyl number 24; iodine number 11.95, which was equivalent to 1 double bond per 2120 units of molecular weight. This tetrapolymer was extended according to the procedure of Example 1(B) except the ratio of bis chloroformate to piperazine was 1:1.5. This elastomer had a gel content of 0.2%, a dilute solution viscosity of 1.43 and an iodine number of 10.4 and 1 double bond per 2420 units of molecular weight. This elastomer could be readily milled and banded.

EXAMPLE 6

Preparation of another tetrapolymer

The terpolymer procedure of Example 2 was repeated using the following ingredients: 750 parts of tetrahydrofuran; 31 parts of boron trifluoride; 9.75 parts ethylene oxide and 65 parts of allyl glycidyl ether, except 185 parts of butylene oxide was added prior to the hydrolysis step. This butylene oxide was a mixture of butylene oxide-1,2 and butylene oxide-2,3. This terpolymer was hydrolyzed in the manner described in Example 5 to give a tetrapolymer having a molecular weight of 3210, a hydroxyl number of 35, an iodine number of 12.3, a melting point of about −9 to −12° C. and 1 double bond per 2060 units of molecular weight. This material was converted by the procedure of Example 1(B) to a polyurethane elastomer having a relatively high dilute solution viscosity and good milling and banding characteristics as well as good low temperature properties.

EXAMPLE 7

The procedure of Example 6 was repeated except 185 parts of epoxy octane was substituted for the 185 parts of butylene oxide. The tetrapolymer obtained by this substitution had a molecular weight of 2200, a hydroxyl number of 51, an iodine number of 10.3, a melting point of 3° to 6° C. and 1 double bond per 2640 units of molecular weight. This hydroxyl-terminated tetrapolymer could be readily extended by the procedure of Example 1(B) to give a polyurethane elastomer of relatively high dilute solution viscosity and having good milling and banding characteristics.

EXAMPLE 8

A number of terpolymers were made in accordance with the teachings of Example 2 using various percentages of allyl glycidyl ether. The melting points of the resulting polymers are listed in Table I below:

TABLE 1

| Monomer, Approximate Percent Used | | | Melting Point, °C. |
|---|---|---|---|
| Tetrahydrofuran | Allyl Glycidyl Ether | Initiator | |
| 74 | 24 | Ethylene oxide | +8 |
| 89 | 9 | do | +16 |
| 93 | 6 | do | +20 |
| 100 | None | None added | +37 |

EXAMPLE 9

To demonstrate the effect of the mols of initiator used per mol of polymer produced upon the physical properties of the finished elastomer prepared by the diamine process, a number of runs using the procedure of Example 1 were made. The results of these runs, using the indicated ratio of initiator per mol of polymer produced are shown in Table II. The data of Table II very clearly shows the sensitivity of the dilute solution viscosity of the elastomer derived from the polyether glycol upon the ratio of initiator to polymer produced.

TABLE II

| Run | Molecular Weight Polyether Glycol | Mols of Initiator Per Mol of Polymer Produced | Elastomer D.S.V.* | Milling Characteristics |
|---|---|---|---|---|
| 1 | 2,610 | 7.22 | 0.77 | Poor. |
| 2 | 5,200 | 6.75 | 0.81 | Do. |
| 3 | 5,560 | 6.02 | 0.95 | Do. |
| 4 | 2,160 | 5.32 | 1.57 | Fair. |
| 5 | 4,900 | 2.4 | 2.4 | Good. |
| 6 | 4,920 | 2.4 | 2.2 | |
| 7 | 3,020 | 2.1 | 2.0 | Good. |
| 8 | 1,600 | 2.8 | 2.0 | |
| 9 | 5,300 | 2.4 | 2.1 | |
| 10 | 5,500 | 2.4 | 2.0 | |
| 11 | 5,430 | 2.4 | 2.6 | |
| 12 | 2,740 | 2.2 | 2.0 | |

*D.S.V. is dilute solution viscosity at 30° C. of 0.3 gram of the elastomer dissolved in 100 mols of chloroform.

EXAMPLE 10

A number of polyether glycols were made by polymerizing tetrahydrofuran. The results of these polymerization runs are shown in Table III. It will be noted from the data of this table that the use of allyl glycidyl ether as an initiator gives a hydroxyl terminated polymer which yields by the diamine process an elastomer having a relatively low dilute solution viscosity, but where ethylene oxide is used as the initiator, the elastomer derived from its polymer has a relatively high dilute solution viscosity. From the dilute solution viscosity data of runs 5 and 6 of Table III, it is readily apparent that with propylene oxide as the initiator, these polyether glycols were extendable to give rubbers which have very low dilute solution viscosities and which were unsatisfactory from a milling and banding standpoint.

TABLE III

| | Approx. Weight Percent Monomer Used* | | | Polyether Glycol | | |
|---|---|---|---|---|---|---|
| Run | THF | AGE | Polymer Initiator | Molecular Weight | Mols of Initiator Per Mol of Glycol | Elastomer D.S.V. |
| 1 | 90 | 10 | Allyl glycidyl ether | 5,100 | 5.5 | 0.51 |
| 2 | 90 | 10 | Ethylene oxide | 3,280 | 1.4 | 1.4 |
| 3 | 90 | 10 | do | 2,870 | 1.1 | 1.8 |
| 4 | 90 | 10 | do | 2,570 | 1.1 | 1.7 |
| 5 | 90 | 10 | Propylene oxide | 2,750 | 3.7 | 1.1 |
| 6 | 100 | 0 | do | 4,320 | 2.3 | 0.85 |

*These percentages are expressed on the basis of the percent THF (tetrahydrofuran), plus the percent AGE (allyl glycidyl ether or 1-allyloxy-2,3 epoxy propane) equals 100 percent, even though the polymer contains hydroxyl groups and initiator monomer.

EXAMPLE 11

The procedure of Example 1 was repeated using 935 parts of tetrahydrofuran on 0.44 mol of antimony pentachloride as the catalyst, and 0.22 mol of ethylene oxide as the initiator. Then, prior to the water hydrolysis step, 65 parts of allyl glycidyl ether dissolved in 300 milliliters of hexane was added to the reaction mixture, and after it had reacted the catalyst complex was decomposed with several volumes of water. The water decomposed the catalyst complex to yield a hydroxyl-terminated polymer having a hydroxyl number of 15.1, an iodine number of 16.7 and a molecular weight of 7440. This iodine number represents 1 double bond per 1520 units of molecular weight. This polymer was emulsion polymerized by the procedure of Example 1(B) and the resulting elastomer had good rubbery properties.

EXAMPLE 12

The polymerization procedure of Example 11 was repeated except 0.44 mol of ferric chloride and 0.44 mol of thionyl chloride were used as the catalyst instead of antimony pentachloride. The polymer obtained had a molecular weight of 11,000, a hydroxyl number of 10.2 and an iodine number of 20.5. This iodine number represented 1 double bond per 2480 units of molecular weight. This polymer was readily extended by the method of Example 2(B) to give a satisfactory elastomer.

What is claimed is:

1. An adjusted hydrophilic-hydrophobic modified ether glycol of about 700 to less than 12,000 molecular weight substantially of the structure obtained by
    (1) polymerizing at less than 10° C. tetrahydrofuran, a hydrophilic initiator and 0 to 30 percent by weight of a modifying monomer in the presence of a Lewis acid catalyst capable of breaking the carbon-oxygen bond of tetrahydrofuran to form a polymer complex,
        said catalyst being present in the tetrahydrofuran at the time the initiator becomes a part of the tetrahydrofuran-catalyst mixture and in quantities sufficient to give an excess of catalyst over said initiator, said initiator being selected from the class consisting of ethylene oxide, trimethylene oxide and dioxolane and being present in the amount of at least one mol and no more than 5.5 mols of initiator for each mol of polymer produced.
        said modifying monomer being an epoxy monomer selected from the class consisting of epoxy aliphatic monomers containing unsaturation and from 4 to 10 carbon atoms selected from the group consisting of butadiene monoxide, isoprene monoxide, epoxy octyloctylene ether, allyl glycidyl ether and glycidyl vinyl ether, and being added to the tetrahydrofuran-catalyst mixture containing the initiator, and
    (2) treating said polymer complex with water to produce a polymer containing hydroxyl groups.

References Cited

UNITED STATES PATENTS 2,927,098   3/1960   Goldberg _____ 260—77.5
3,254,056   5/1966   Lovell.

FOREIGN PATENTS 541,842   6/1957   Canada.

OTHER REFERENCES

U.S. Publication Board Report 717, pages 6, 10, 14, 16, 17, 18 and 19 (numbers appear at top of page) Jan. 11, 1946.

Technical Report No. 123–45, July 1946, pp. 5 and 6.

(1958), pp. 163–166.

Schwartz et al., Surface Active Agents and Detergents (1958) pp. 163–166.

BERNARD HELFIN, Primary Examiner

U.S. Cl. X.R.

260—2, 2.5, 45.7, 77.5, 611